United States Patent
Saito

(10) Patent No.: US 9,315,656 B2
(45) Date of Patent: Apr. 19, 2016

(54) VIBRATION ISOLATING RUBBER COMPOSITION AND VIBRATION ISOLATING RUBBER

(75) Inventor: Takahiro Saito, Yokohama (JP)

(73) Assignee: BRIDGESTONE CORPORATION, Tokyo (JP)

( * ) Notice: Subject to any disclaimer, the term of this patent is extended or adjusted under 35 U.S.C. 154(b) by 0 days.

(21) Appl. No.: 13/510,481

(22) PCT Filed: Nov. 15, 2010

(86) PCT No.: PCT/JP2010/070278
§ 371 (c)(1),
(2), (4) Date: May 17, 2012

(87) PCT Pub. No.: WO2011/062135
PCT Pub. Date: May 26, 2011

(65) Prior Publication Data
US 2012/0232208 A1 Sep. 13, 2012

(30) Foreign Application Priority Data
Nov. 18, 2009 (JP) .................................. 2009-263030

(51) Int. Cl.
| | | |
|---|---|---|
| C08K 3/34 | (2006.01) | |
| C08L 7/00 | (2006.01) | |
| C08K 5/5419 | (2006.01) | |
| C08K 5/548 | (2006.01) | |
| C08K 3/04 | (2006.01) | |
| C08K 3/36 | (2006.01) | |

(52) U.S. Cl.
CPC ... C08L 7/00 (2013.01); *C08K 3/04* (2013.01); *C08K 3/36* (2013.01); *C08K 5/548* (2013.01); *C08K 5/5419* (2013.01)

(58) Field of Classification Search
CPC .......... C08K 3/34; C08K 3/04; C08K 5/5419; C08K 5/548; C08L 7/00
See application file for complete search history.

(56) References Cited

U.S. PATENT DOCUMENTS

| | | | | |
|---|---|---|---|---|
| 5,500,482 A | * | 3/1996 | Muraki et al. .................. 525/98 |
| 6,021,831 A | * | 2/2000 | Yamauchi et al. ......... 152/209.7 |
| 6,239,203 B1 | * | 5/2001 | Sandstrom et al. ........... 524/385 |
| 6,333,375 B1 | * | 12/2001 | Nakamura et al. ............ 524/394 |
| 7,884,154 B2 | * | 2/2011 | Okamoto et al. .............. 524/493 |
| 2003/0148885 A1 | * | 8/2003 | Weisbeck et al. ............. 502/400 |
| 2005/0209394 A1 | * | 9/2005 | Sandstrom et al. ........... 524/496 |
| 2006/0217481 A1 | * | 9/2006 | Otsuki .......................... 524/493 |
| 2007/0219320 A1 | * | 9/2007 | Ichino et al. .................. 525/191 |
| 2008/0118751 A1 | * | 5/2008 | Zollner et al. ................. 428/343 |
| 2008/0149248 A1 | * | 6/2008 | Zanzig et al. ................. 152/525 |
| 2010/0087586 A1 | * | 4/2010 | Oohara ......................... 524/526 |
| 2010/0218868 A1 | * | 9/2010 | Tonosaki et al. ......... 152/209.18 |

FOREIGN PATENT DOCUMENTS

| | | | |
|---|---|---|---|
| EP | 1 640 182 A1 | | 3/2006 |
| EP | 1 707 402 A1 | | 10/2006 |
| JP | 2002-327091 A | | 11/2002 |
| JP | 2006-131871 A | | 5/2006 |
| JP | 2006-143859 A | | 6/2006 |
| JP | 2008-163067 | * | 7/2008 |
| JP | 2009-019076 A | | 1/2009 |
| JP | 2009-24046 A | | 2/2009 |
| JP | 2009-249484 A | | 10/2009 |
| JP | 2009-256576 A | | 11/2009 |
| JP | 2009-256580 A | | 11/2009 |
| WO | 2008/047582 | * | 4/2008 |
| WO | 2009/022665 | * | 2/2009 |

OTHER PUBLICATIONS

English language abstract JP 2008-163067, Jul. 2008.*
machine generated translation JP 2008-163067, Jul. 2008.*
Extended European Search Report issued on Jul. 23, 2013 from the European Patent Office in corresponding European Application No. 10831529.2.
"Struktol Rubber Handbook", Sep. 30, 2004, pp. 60a-60h, XP055206327, Retrieved from the Internet: URL:http://www.struktol.com/pdfs/Pg. 60a-60h—Silane Coupling Agents.pdf and http://struktol.com/pdfs/RubberHB.pdf [retrieved on Aug. 5, 2015].
European Office Action issued on Aug. 11, 2015 from the European Patent Office in corresponding European Application No. 10 831 529.2.

* cited by examiner

Primary Examiner — Margaret Moore
(74) Attorney, Agent, or Firm — Sughrue Mion, PLLC

(57) ABSTRACT

Disclosed are a vibration isolating rubber composition that balances a low dynamic-to-static modulus with high durability, and a vibration isolating rubber that is formed by curing said rubber composition. The vibration isolating rubber composition is characterized by including a diene rubber, and a carbon black and a silica as fillers, and in that the mixing ratio of the carbon black (a) and the silica (b) is (a)/(b)=80/20 to 20/80 (weight ratio).

14 Claims, No Drawings

VIBRATION ISOLATING RUBBER COMPOSITION AND VIBRATION ISOLATING RUBBER

CROSS REFERENCE TO RELATED APPLICATIONS

This application is a National Stage of International Application No. PCT/JP2010/070278 filed on Nov. 15, 2010, which claims priority from Japanese Patent Application No. 2009-263030, filed on Nov. 18, 2009, the contents of all of which are incorporated herein by reference in their entirety.

TECHNICAL FIELD

The present invention relates to a vibration isolating rubber composition which can be suitably used for a vibration isolating rubber for use in high-temperature environments, such as a torsional damper, an engine mount or a muffler hanger in automobiles.

BACKGROUND ART

In vehicles such as automobiles, conventionally, attempts to dispose various vibration isolators at those parts probably serving as sources of vibrations or noises and thereby to restrain the vibrations or noises from penetrating into the vehicle compartment have been made, in order to enhance comfort of the passengers. For example, in relation to an engine which is a main source of vibrations and noises, vibration isolating rubbers have been used for such component members as the torsional damper and the engine mount, to thereby absorb the vibrations during driving of the engine and to restrain both penetration of vibrations or noises into the compartment and diffusion of the noises to the peripheral environments.

As fundamental properties, such a vibration isolating rubber is required to have a strength characteristic for supporting a heavyweight body such as the engine and a vibration isolating performance for absorbing and suppressing vibrations. Further, a vibration isolating rubber for use in a high-temperature environment such as an engine room is required to have not only a low dynamic-to-static modulus ratio and an excellent vibration isolating performance but also high thermal resistance and durability. Especially, in recent years, the temperature inside the engine room has been tending to rise, attendant on a rise in engine output and a saving of engine room space for securing a wider compartment space. This tendency urges the vibration isolating rubber to be more often used in severer environments. Consequently, the vibration isolating rubbers for automotive use have come to be desired to meet severer requirements in regard of thermal resistance and the like.

An art in which silica gel is blended into a base rubber, in order to attain both a low dynamic-to-static modulus ratio and good thermal resistance, has been proposed in JP-A 2006-131871 (Patent Document 1). In addition, an art in which a high-structure carbon having a large particle diameter is blended into a base rubber, in order to achieve both a low dynamic-to-static modulus ratio and good thermal resistance, has been proposed in JP-A 2006-143859 (Patent Document 2). In general, however, the relationship between a low dynamic-to-static modulus ratio and good thermal resistance as well as the relationship between a low dynamic-to-static modulus ratio and good durability is an antinomic relationship. Besides, it is desired to achieve a lowering in dynamic-to-static modulus ratio and enhancement of durability on a still higher level as compared with the above-mentioned related arts.

PRIOR-ART DOCUMENTS

Patent Documents

Patent Document 1: JP-A 2006-131871
Patent Document 2: JP-A 2006-143859

SUMMARY OF THE INVENTION

Problems to be Solved by the Invention

The present invention has been made in consideration of the above-mentioned circumstances. Accordingly, it is an object of the present invention to provide a vibration isolating rubber composition capable of achieving both a low dynamic-to-static modulus ratio and high durability, and a vibration rubber formed by curing the rubber composition.

Means for Solving the Problems

The present inventor made earnest investigations in order to attain the above object. As a result of the investigations, the inventor found out that when a diene rubber is admixed with a small-particle-diameter carbon black and a silica, it is possible to achieve both a low dynamic-to-static modulus ratio and high durability on such a high level as not to be attainable according to the related art. Based on the finding, the present invention has been attained. Specifically, in a vibration isolating rubber composition according to the present invention, a small-particle-diameter carbon of which application has been difficult in the related art is used, and the carbon is partly replaced by a silica, whereby a lowered dynamic-to-static modulus ratio and a high durability are realized.

Accordingly, the present invention provides the following vibration isolating rubber composition and vibration isolating rubber.

[1] A vibration isolating rubber composition including a diene rubber, and a carbon black and a silica as fillers, characterized in that the mixing ratio of the carbon black (a) and the silica (b) is (a)/(b)=80/20 to 20/80 (weight ratio).

[2] The vibration isolating rubber composition according to the paragraph [1], wherein natural rubber (NR) is singly used as the diene rubber.

[3] The vibration isolating rubber composition according to the paragraph [1], wherein natural rubber (NR) and butadiene rubber are used together as the diene rubber.

[4] The vibration isolating rubber composition according to the paragraph [1], [2] or [3], wherein the carbon black has an iodine adsorption number in the range of 40 to 140 g/kg and a DBP oil absorption amount in the range of 90 to 160 ml/100 g.

[5] The vibration isolating rubber composition according to any one of the paragraphs [1] to [4], wherein the silica is a silica gel having a nitrogen adsorption specific surface area (BET method) in the range of 80 to 230 $m^2/g$.

[6] The vibration isolating rubber composition according to any one of the paragraphs [1] to [5], including a silane coupling agent.

[7] A vibration isolating rubber formed by curing the rubber composition according to any one of the paragraphs [1] to [6].

Advantageous Effect of the Invention

The vibration isolating rubber composition according to the present invention is capable of achieving both a high vibration isolating performance (low dynamic-to-static modulus ratio) and high durability.

EMBODIMENT FOR CARRYING OUT THE INVENTION

In the vibration isolating rubber composition of the present invention, a diene rubber is used as a rubber component.

As the diene rubber, known ones can be used, without any particular restriction. Specific examples of the diene rubber include known natural rubber; synthetic rubbers such as butadiene rubber, styrene-butadiene rubber (SBR), isoprene rubber, styrene-isoprene copolymer, butyl rubber, halogenated butyl rubber, chloroprene rubber, isobutylene-isoprene rubber, acrylonitrile-butadiene rubber, epoxidized natural rubber, and acrylate butadiene rubber; and rubbers obtained by modifying a molecular chain terminal of any of the natural rubber and synthetic rubbers. These diene rubbers may be used either singly or in combination of two or more of them. In the present invention, natural rubber, butadiene rubber, and styrene-butadiene rubber (SBR) can be used particularly preferably.

Besides, other rubbers than the diene rubbers can also be blended in the rubber component. Examples of the other rubbers include acrylic rubber and ethylene-propylene-diene rubber (EPDM).

A vulcanizing agent is used without any special restriction. Examples of the vulcanizing agent include sulfur and peroxides. Where sulfur is used, the amount of sulfur to be blended in the rubber composition is 0.1 to 5 parts by weight, preferably 0.2 to 3 parts by weight, per 100 parts by weight of the rubber component. If the amount of sulfur is out of this range, the crosslink density of the rubber would be so high as to worsen durability as well as such fundamental properties as vibration isolating performance. Besides, peroxides can also be used as the vulcanizing agent; in this case, commercial peroxide vulcanizing agents may be used either singly or as a mixture of two or more of them. These vulcanizing agents are blended in an amount of normally 1 to 10 parts by weight, preferably 2 to 8 parts by weight, per 100 parts by weight of the rubber component. If the amount of the vulcanizing agent exceeds 10 parts by weight, the rubber would be cured excessively, possibly leading to a lowered elongation at break or a lowered breaking strength. If the amount of the vulcanizing agent is less than 1 parts by weight, it may lead to a lowered crosslink density, a lowered breaking strength, a worsened dynamic-to-static modulus ratio, a worsened compression set, or a lowered durability.

In the present invention, it is recommended to blend a carbon black as a filler. As the carbon black, known ones can be used, without any particular restriction. Examples of the carbon black include SRF, GPF, FEF, HAF, ISAF, SAF, FT, and MT. In the present invention, HAF can be used preferably. These carbon blacks may be used either singly or in combination of two or more of them. As the carbon black, those which have an iodine adsorption number in the range of 40 to 140 g/kg and a DBP oil absorption amount in the range of 90 to 160 ml/100 g are used preferably. In the related art, such small-particle-diameter carbon blacks have not been adopted, since they would raise the dynamic-to-static modulus ratio, although they can promise an enhanced durability. In the present invention, on the other hand, a lowering in dynamic-to-static modulus ratio can be promised even when a small-particle-diameter carbon black is blended. From the viewpoint of lowering the dynamic-to-static modulus ratio, the amount of the carbon black blended is preferably 10 to 80 parts by weight per 100 parts by weight of the rubber component.

In addition, it is recommended to blend a silica as a filler, and it is particularly preferable to use a silica gel that has a nitrogen adsorption specific surface area (BET method) in the range of 80 to 230 $m^2/g$. If the BET specific surface area is below 80 $m^2/g$, it is difficult to secure sufficient durability. If the BET specific surface area exceeds 230 $m^2/g$, on the other hand, it becomes difficult for the silica gel to be dispersed into the base rubber. In this case, from the viewpoint of lowering the dynamic-to-static modulus ratio, the amount of the silica blended is preferably 10 to 80 parts by weight, per 100 parts by weight of the rubber component.

The mixing ratio of the carbon black (a) and the silica (b) is to be in the range of (a)/(b)=80/20 to 20/80 (weight ratio). If the mixing ratio of the carbon black (a) is above this range, it is difficult to achieve both a low dynamic-to-static modulus ratio and good durability. If the mixing ratio of the silica (b) is above the range, on the other hand, a problem in processability would be generated.

A silane coupling agent for the silica can be contained in the rubber composition. The kind of the silane coupling agent is not particularly restricted, and known commercial silane coupling agents can be used either singly or in combination of two or more of them. The amount of the silane coupling agent to be blended is 1 to 10 wt %, preferably 5 to 10 wt %, based on the amount of the silica. If the amount of the silane coupling agent is less than 1 wt %, an enhancing effect on dispersibility and reinforcing property may be obtainable only insufficiently. The use of the silane coupling agent in an amount in excess of 10 wt %, on the other hand, may fail to produce an effect according to the increased amount, and is not favorable from industrial and economic points of view.

As an oil, known ones can be used, without any special restriction. Examples of the oil which can be used include process oils such as aromatic oil, naphthenic oil and paraffin oil; vegetable oils such as coconut oil; synthetic oils such as alkylbenzene oils; and castor oil. These can be used either singly or in combination of two or more of them.

In the present invention, from the viewpoint of accelerating vulcanization, a vulcanization accelerator such as zinc white (ZnO) and fatty acids can be blended in the rubber composition. The fatty acid may be any of saturated or unsaturated fatty acids, and may be any of straight-chain or branched fatty acids. The number of carbon atoms in the fatty acid is not particularly limited; for example, fatty acids having 1 to 30 carbon atoms, preferably 15 to 30 carbon atoms can be used. More specific examples of the fatty acid include saturated acids such as cyclohexanoic acid (cyclohexanecarboxylic acid), naphthenic acids such as alkylcyclopentanes having a side chain, hexanoic acid, octanoic acid, decanoic acid (inclusive of branched carboxylic acids such as neodecanoic acid), dodecanoic acid, tetradecanoic acid, hexadecanoic acid, and octadecanoic acid (stearic acid); unsaturated acids such as methacrylic acid, oleic acid, linolic acid, and linoleic acid; and resin acids such as rosin, tall oil acid, and abietic acid. These fatty acids may be used either singly or in combination of two or more of them. In the present invention, zinc white and stearic acid can be used preferably. The amount of these vulcanization accelerators blended in the rubber composition is preferably 1 to 15 parts by weight, more preferably 2 to 10 parts by weight, per 100 parts by weight of the rubber component.

As an antioxidant, known ones can be used, without any special restriction. Examples of the antioxidant include phenol antioxidants, imidazole antioxidants, and amine antioxidants. The amount of these antioxidants blended in the rubber composition is normally 0.5 to 10 parts by weight, preferably 1 to 5 parts by weight, per 100 parts by weight of the rubber component.

In obtaining the rubber composition according to the present invention, the method of blending the above-mentioned ingredients is not particularly restricted. The constituent materials may all be mixed at a time, followed by kneading, or the constituent materials may be mixed in two steps or three steps, followed by kneading. Incidentally, for the kneading, such a kneading machine as rolls, an internal mixer, and a Banbury rotor can be used. Furthermore, in molding the rubber composition into the shape of a sheet, a belt or the like, a known molding machine such as an extruder and a pressing machine may be used.

EXAMPLES

Now, the present invention will be described in detail below by showing Examples and Comparative Examples, but the following Examples are not to be construed as restrictive of the invention.

Examples 1 to 12, Comparative Examples 1 to 6

By kneading materials according to the formulations set forth in Tables 1 and 2 below and vulcanizing the kneaded mixtures, vibration isolating rubber compositions of Examples 1 to 12 and Comparative Examples 1 to 6 were vulcanized and cured in a predetermined shape under predetermined conditions, to produce molded articles. The molded articles thus obtained were used as specimens for evaluation of the vibration isolating rubber according to the present invention. For the molded articles obtained, hardness (Hs), tensile elongation (Eb), tensile strength (Tb) and durability were measured and evaluated according to the following JIS standards. These results are also shown in Tables 1 and 2.

[Hardness (Hs)]
According to JIS K 6253 (Type A).
[Tensile Elongation (Eb)]
According to JIS K 6251.
[Tensile Strength (Tb)]
According to JIS K 6251.
[Durability (Stretch Fatigue Durability)]
Elongation by 0 to 200% was repeated at 35° C., and the number of times of elongation until rupture was counted. The counts were put to index representation wherein the count for Comparative Example 1 was taken as a reference (base of index) "100."

[Static Spring Constant (Ks) and Dynamic-to-static Modulus Ratio (Kd/Ks)]
According to JIS K 6385, Kd was measured at 100 Hz. The dynamic-to-static modulus ratio (Kd/Ks) was evaluated by the relation between Kd/Ks and Ks.
[Processability]
Processability was judged through injection molding. The mark "○" represents good processability, while the mark "×" represents bad processability.

The details of the above-mentioned formulations are as follows.
Rubber Component
  (1) Natural rubber (NR), "RSS#1"
  (2) Polybutadiene rubber (BR), "BR01" made by JSR Corporation
Carbon Black
  All the carbon blacks are made by Asahi Carbon Co., Ltd.
  (1) HAF, trade name "#70"
    Iodine adsorption number: 82 g/kg
    DBP oil absorption amount: 102 ml/100 g
  (2) ISAF, trade name "#80N"
    Iodine adsorption number: 121 g/kg
    DBP oil absorption amount: 114 ml/100 g
  (3) FEF, trade name "#65"
    Iodine adsorption number: 43 g/kg
    DBP oil absorption amount: 121 ml/100 g
  (4) FT, trade name "Asahi Thermal"
    Iodine adsorption number: 27 g/kg
    DBP oil absorption amount: 28 ml/100 g
  (5) SAF, trade name "#110"
    Iodine adsorption number: 145 g/kg
    DBP oil absorption amount: 113 ml/100 g
Silica
  Precipitated silicas made by Tosoh Silica Corporation.
  (1) "NIPSIL VN3," nitrogen adsorption specific surface area (BET method): 180 to 230 $m^2/g$
  (2) "NIPSIL E75," nitrogen adsorption specific surface area (BET method): 30 to 60 $m^2/g$
Silane Coupling Agent
  Bis-3-triethoxysilylpropyl tetrasulfide (TESPT), made by Evonik Degussa
Naphthenic Oil
  "Diana Process Oil NS-100," made by Idemitsu Kosan Co., Ltd.
Wax
  "Antilux 654," made by Rhein Chemie
Antioxidant: RD
  2,2,4-trimethyl-1,2-dihydroquinoline polymer, "Nocrac 224," made by Ouchi Shinko Chemical Industrial Co., Ltd.
Antioxidant: 6PPD
  N-phenyl-N'-(1,3-dimethylbutyl)-p-phenylenediamine, "Nocrac 6C," made by Ouchi Shinko Chemical Industrial Co., Ltd.
Vulcanization Accelerator: TMTD
  Tetramethylthiuram disulfide (TMTD), "Nocceler TT," made by Ouchi Shinko Chemical Industrial Co., Ltd.
Vulcanization Accelerator: CBS
  N-cyclohexyl-2-benzothiazyl sulfenamide (CBS)

TABLE 1

| | | Example | | | | | | | | | | | |
|---|---|---|---|---|---|---|---|---|---|---|---|---|---|
| | | 1 | 2 | 3 | 4 | 5 | 6 | 7 | 8 | 9 | 10 | 11 | 12 |
| Ingredients (parts by weight) | Natural rubber | 100 | 100 | 100 | 100 | 100 | 70 | 100 | 100 | 100 | 100 | 100 | 100 |
| | Polybutadiene rubber | | | | | | 30 | | | | | | |
| | HAF carbon black | 30 | 24 | 20 | 16 | 10 | 20 | | | | | 20 | |
| | ISAF carbon black | | | | | | | 24 | 16 | | | | |
| | FEF carbon black | | | | | | | | | 24 | 16 | | |

TABLE 1-continued

| | | Example 1 | 2 | 3 | 4 | 5 | 6 | 7 | 8 | 9 | 10 | 11 | 12 |
|---|---|---|---|---|---|---|---|---|---|---|---|---|---|
| | FT carbon black | | | | | | | | | | | | 32 |
| | SAF carbon black | | | | | | | | | | | | |
| | NIPSIL VN3 | 10 | 16 | 20 | 24 | 30 | 20 | 16 | 24 | 16 | 24 | | 24 |
| | NIPSIL E75 | | | | | | | | | | | 30 | |
| | Silane coupling agent | 1.0 | 1.6 | 2.0 | 2.4 | 3.0 | 2.0 | 1.6 | 2.4 | 1.6 | 2.4 | 3.0 | 2.4 |
| | Naphthenic oil | 5 | 5 | 5 | 5 | 5 | 5 | 5 | 5 | 5 | 5 | 5 | 5 |
| | Stearic acid | 2 | 2 | 2 | 2 | 2 | 2 | 2 | 2 | 2 | 2 | 2 | 2 |
| | Zinc white | 5 | 5 | 5 | 5 | 5 | 5 | 5 | 5 | 5 | 5 | 5 | 5 |
| | Wax | 2 | 2 | 2 | 2 | 2 | 2 | 2 | 2 | 2 | 2 | 2 | 2 |
| | Antioxidant: RD | 1 | 1 | 1 | 1 | 1 | 1 | 1 | 1 | 1 | 1 | 1 | 1 |
| | Antioxidant: 6PPD | 1 | 1 | 1 | 1 | 1 | 1 | 1 | 1 | 1 | 1 | 1 | 1 |
| | Sulfur | 1.0 | 1.0 | 1.0 | 1.0 | 1.0 | 1.0 | 1.0 | 1.0 | 1.0 | 1.0 | 1.0 | 1.0 |
| | Vulcanization accelerator: TMTD | 0.5 | 0.5 | 0.5 | 0.5 | 0.5 | 0.5 | 0.5 | 0.5 | 0.5 | 0.5 | 0.5 | 0.5 |
| | Vulcanization accelerator: CBS | 1.0 | 1.0 | 1.0 | 1.0 | 1.0 | 1.0 | 1.0 | 1.0 | 1.0 | 1.0 | 1.0 | 1.0 |
| Rubber physical properties | Rubber hardness Hs (°) | 60 | 60 | 60 | 60 | 61 | 61 | 62 | 62 | 60 | 60 | 57 | 61 |
| | Eb (%) | 530 | 520 | 540 | 540 | 530 | 520 | 540 | 560 | 530 | 560 | 520 | 510 |
| | Tb (MPa) | 26.2 | 26.0 | 27.4 | 27.3 | 27.4 | 25.1 | 27.0 | 28.9 | 24.8 | 27.6 | 23.2 | 21.0 |
| Durability | Stretch fatigue durability, Count (INDEX) | 122 | 132 | 130 | 149 | 153 | 138 | 146 | 154 | 104 | 149 | 80 | 74 |
| Dynamic properties | Ks (N/mm) | 133.1 | 135.9 | 135.8 | 134.9 | 139.8 | 141.0 | 141.0 | 140.0 | 132.9 | 135.5 | 119.0 | 148.0 |
| | Kd (N/mm) 100 Hz | 215.5 | 219.9 | 218.5 | 216.7 | 225.3 | 220.1 | 243.8 | 228.0 | 203.3 | 207.9 | 154.7 | 215.6 |
| | $Kd_{100}/Ks$ | 1.62 | 1.62 | 1.61 | 1.61 | 1.61 | 1.56 | 1.73 | 1.63 | 1.53 | 1.53 | 1.30 | 1.46 |
| | Evaluation of dynamic-to-static modulus ratio | ○ | ○ | ○ | ○ | ○ | ○ | ○ | ○ | ○ | ○ | ○ | ○ |
| Processability | | ○ | ○ | ○ | ○ | ○ | ○ | ○ | ○ | ○ | ○ | ○ | ○ |

TABLE 2

| | | Comparative Example 1 | 2 | 3 | 4 | 5 | 6 |
|---|---|---|---|---|---|---|---|
| Ingredients (parts by weight) | Natural rubber | 100 | 100 | 100 | 100 | 100 | 100 |
| | Polybutadiene rubber | | | | | | |
| | HAF carbon black | 40 | 36 | 4 | 0 | | |
| | ISAF carbon black | | | | | 40 | |
| | FEF carbon black | | | | | | 40 |
| | FT carbon black | | | | | | |
| | SAF carbon black | | | | | | |
| | NIPSIL VN3 | 0 | 4 | 36 | 40 | | |
| | NIPSIL E75 | | | | | | |
| | Silane coupling agent | | 0.4 | 3.6 | 4.0 | | |
| | Naphthenic oil | 5 | 5 | 5 | 5 | 5 | 5 |
| | Stearic acid | 2 | 2 | 2 | 2 | 2 | 2 |
| | Zinc white | 5 | 5 | 5 | 5 | 5 | 5 |
| | Wax | 2 | 2 | 2 | 2 | 2 | 2 |
| | Antioxidant: RD | 1 | 1 | 1 | 1 | 1 | 1 |
| | Antioxidant: 6PPD | 1 | 1 | 1 | 1 | 1 | 1 |
| | Sulfur | 1.0 | 1.0 | 1.0 | 1.0 | 1.0 | 1.0 |
| | Vulcanization accelerator: TMTD | 0.5 | 0.5 | 0.5 | 0.5 | 0.5 | 0.5 |
| | Vulcanization accelerator: CBS | 1.0 | 1.0 | 1.0 | 1.0 | 1.0 | 1.0 |
| Rubber physical properties | Rubber hardness Hs (°) | 60 | 60 | 62 | 62 | 63 | 59 |
| | Eb (%) | 550 | 540 | 540 | 550 | 590 | 530 |
| | Tb (MPa) | 26.0 | 26.6 | 27.8 | 29.8 | 29.0 | 23.1 |
| Durability | Stretch fatigue durability, Count (INDEX) | 100 | 110 | 165 | 192 | 112 | 87 |

TABLE 2-continued

|  |  | Comparative Example | | | | | |
|---|---|---|---|---|---|---|---|
|  |  | 1 | 2 | 3 | 4 | 5 | 6 |
| Dynamic properties | Ks (N/mm) | 129.5 | 130.9 | 143.1 | 145.4 | 142.6 | 133.9 |
|  | Kd (N/mm) 100 Hz | 236.1 | 225.0 | 231.4 | 237.9 | 289.2 | 209.7 |
|  | $Kd_{100}$/Ks | 1.82 | 1.72 | 1.62 | 1.64 | 2.03 | 1.57 |
|  | Evaluation of dynamic-to-static modulus ratio | X | X | ○ | ○ | X | ○ |
| Processabiilty |  | ○ | ○ | X | X | ○ | ○ |

As seen from Tables 1 and 2 above, the rubber compositions of Examples of the present invention each had a low dynamic-to-static modulus ratio and good durability and processability.

On the other hand, the rubber compositions of Comparative Examples 1, 2 and 5 were poorer in dynamic-to-static modulus ratio than the rubber compositions of Examples. The rubber compositions of Comparative Examples 3 and 4 were poorer in processability than the rubber compositions of Examples. The rubber composition of Comparative Example 6 was poorer in durability than the rubber compositions of Examples.

The invention claimed is:

1. A vibration isolating rubber composition consisting of a diene rubber,
a carbon black and a silica as fillers, wherein the mixing ratio of the carbon black (a) and the silica (b) is (a)/(b) =80/20 to 20/80 (weight ratio),
a silane coupling agent blended in the composition in an amount of 1 to 10 wt % based on the amount of the silica, and
optional components,
wherein the amount of the carbon black is from 10 to 16 parts by weight per 100 parts by weight of the diene rubber,
wherein the carbon black has an iodine adsorption number in the range of 40 to 140 g/kg and a DBP oil absorption amount in the range of 90 to 160 ml/100 g and is selected from the group consisting of SRF, GPF, FEF, FT and MT,
wherein the silica is a silica gel having a nitrogen adsorption specific surface area (BET method) in the range of 80 to 230 $m^2$/g,
wherein natural rubber (NR) is singly used as the diene rubber, or natural rubber (NR) and butadiene rubber (BR) are used together as the diene rubber within a blending ratio of NR/BR=70/30 to 100/0 (weight ratio), and
wherein the optional components are selected from the group consisting of vulcanizing agents, oils, vulcanization accelerators and antioxidants.

2. A vibration isolating rubber formed by curing the rubber composition according to claim 1.

3. The vibration isolating rubber composition according to claim 1, further comprising at least one oil selected from the group consisting of aromatic oil, naphthenic oil, paraffin oil, vegetable oils, synthetic oils, and castor oil.

4. The vibration isolating rubber composition according to claim 1, further comprising at least one oil selected from the group consisting of aromatic oil, naphthenic oil, paraffin oil, coconut oil, synthetic oils, and castor oil.

5. The vibration isolating rubber composition according to claim 1, further comprising at least one oil selected from the group consisting of aromatic oil, naphthenic oil, paraffin oil, vegetable oils, alkylbenzene oils, and castor oil.

6. The vibration isolating rubber composition according to claim 1, further comprising at least one oil selected from the group consisting of aromatic oil, naphthenic oil, paraffin oil, coconut oil, alkylbenzene oils, and castor oil.

7. A vibration isolating rubber composition consisting of a diene rubber,
a carbon black and a silica as fillers, wherein the mixing ratio of the carbon black (a) and the silica (b) is (a)/(b) =40/60 to 20/80 (weight ratio),
a silane coupling agent blended in the composition in an amount of 1 to 10 wt % based on the amount of the silica, and
optional components,
wherein the amount of the carbon black is from 10 to 16 parts by weight per 100 parts by weight of the diene rubber,
wherein the carbon black has an iodine adsorption number in the range of 40 to 140 g/kg and a DBP oil absorption amount in the range of 90 to 160 ml/100 g and is selected from the group consisting of SRF, GPF, FEF, HAF, FT, and MT,
wherein the silica is a silica gel having a nitrogen adsorption specific surface area (BET method) in the range of 80 to 230 $m^2$/g,
wherein natural rubber (NR) is singly used as the diene rubber, or natural rubber (NR) and butadiene rubber (BR) are used together as the diene rubber within a blending ratio of NR/BR =70/30 to 100/0(weight ratio), and
wherein the optional components are selected from the group consisting of vulcanizing agents, oils, vulcanization accelerators and antioxidants.

8. The vibration isolating rubber composition according to claim 7, further comprising at least one oil selected from the group consisting of aromatic oil, naphthenic oil, paraffin oil, vegetable oils, synthetic oils, and castor oil.

9. The vibration isolating rubber composition according to claim 7, further comprising at least one oil selected from the group consisting of aromatic oil, naphthenic oil, paraffin oil, coconut oil, synthetic oils, and castor oil.

10. The vibration isolating rubber composition according to claim 7, further comprising at least one oil selected from the group consisting of aromatic oil, naphthenic oil, paraffin oil, vegetable oils, alkylbenzene oils, and castor oil.

11. The vibration isolating rubber composition according to claim 7, further comprising at least one oil selected from the group consisting of aromatic oil, naphthenic oil, paraffin oil, coconut oil, alkylbenzene oils, and castor oil.

12. A vibration isolating rubber formed by curing the rubber composition according to claim 7.

13. The vibration isolating rubber composition according to claim 1, wherein the amount of the vulcanizing agent is from 0.1 to 1.0 parts by weight per 100 parts by weight of the diene rubber.

14. The vibration isolating rubber composition according to claim 7, wherein the amount of the vulcanizing agent is from 0.1 to 1.0 parts by weight per 100 parts by weight of the diene rubber.

\* \* \* \* \*